United States Patent
Chen et al.

(10) Patent No.: US 8,325,659 B2
(45) Date of Patent: Dec. 4, 2012

(54) DEVICE DISCOVERY FOR MIXED TYPES OF DIRECTIONAL TERMINALS

(75) Inventors: Richard Chen, Croton-On-Hudson, NY (US); Hong Zhai, Ossining, NY (US); Chun-Ting Chou, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 548 days.

(21) Appl. No.: 12/522,963

(22) PCT Filed: Jan. 16, 2008

(86) PCT No.: PCT/IB2008/050157
§ 371 (c)(1),
(2), (4) Date: Dec. 30, 2009

(87) PCT Pub. No.: WO2008/087595
PCT Pub. Date: Jul. 24, 2008

(65) Prior Publication Data
US 2010/0135224 A1    Jun. 3, 2010

Related U.S. Application Data

(60) Provisional application No. 60/885,192, filed on Jan. 16, 2007.

(51) Int. Cl.
*H04W 4/00* (2009.01)
(52) U.S. Cl. ..................................... 370/329
(58) Field of Classification Search ........................ None
See application file for complete search history.

(56) References Cited

U.S. PATENT DOCUMENTS

| 2005/0226203 | A1* | 10/2005 | Ho .................................. 370/349 |
| 2007/0287384 | A1* | 12/2007 | Sadri et al. .................... 455/63.4 |
| 2008/0002632 | A1* | 1/2008 | Pandey et al. ................. 370/338 |
| 2008/0298329 | A1* | 12/2008 | Mo et al. ........................ 370/338 |
| 2009/0059841 | A1* | 3/2009 | Laroia et al. ................... 370/328 |

FOREIGN PATENT DOCUMENTS

WO    WO2006023834 A2    3/2006

OTHER PUBLICATIONS

Chun-Ting Chou et al., Mobility Support Enhancements for the WiMedia UWB MAC protocol, Broadband Networks, 2005 2nd International Conference on Boston, MA, Oct. 3-7, 2005, Piscataway, NJ, Oct. 3, 2005, pp. 213-219, XP010890344.

* cited by examiner

*Primary Examiner* — John Blanton
(74) *Attorney, Agent, or Firm* — Larry Liberchuk

(57) ABSTRACT

An antenna (740) listens in each of a plurality of steerable sectors to determine if a primary beacon is present; transmits a primary device beacon in each of the plurality of steerable sectors if the primary beacon is not present; and transmits a secondary device beacon in a first one of the plurality of steerable sectors if a primary beacon is discovered. The antenna (740) may transmit the primary and secondary beacons on a different communication channel than a data communication channel or may transmit the primary and secondary beacons on a same communication channel as a data communication channel. The antenna (740) may divide the same communication channel into time slices wherein different time slices of a super-frame are utilized for the primary beacon, the secondary beacon, and the data communication. The secondary device (C, D) sends additional beacons in additional sectors if it receives non-primary beacon from the additional sectors.

20 Claims, 5 Drawing Sheets

DEVICE DISCOVERY FOR MIXED TYPES OF DIRECTIONAL TERMINALS

This application claims the benefits of U.S. Provisional Patent Application Ser. No. 60/885,192, 60/885,184 and 60/885,187, all filed Jan. 16, 2007, which are all incorporated herein by reference in their entireties.

The present system relates to a system, method, user interface (UI) and device for discovering mixed types of directional terminals within a wireless network.

As the wireless spectrum becomes more and more significant as a means of maintaining connectivity, the spectrum becomes more and more crowded which can create problems for wireless access and/or interaction points. An idea of ubiquitous communications for devices in mundane device types, such as refrigerators, washing machines, toys, etc. presents not only a problem in spectrum but extending connectivity to these devices presents a further problem in that connectivity needs to be reliable, although not necessarily with any quality of service (QoS) requirements, and must be cheap. Wireless personal area networks (WPANs) are thought to serve this need and are the subject of an IEEE 802.15 working group having several task groups that focus on different parts of this problem.

As may be readily appreciated, directional antennas may be utilized to increase transmission distance, reduce transmission power requirements, to compensate the higher path loss when using high transmission frequency, (e.g 60 Ghz) and may be implemented to take advantage of spatial reuse. A WPAN formed by devices that employ directional antennas is referred to as a Directional WPAN or D-WPAN as referred to herein after.

To reduce the complexity of antenna design and hardware cost, some antennas have fixed transmission directions or choose to transmit towards only one direction. These antennas generally can not change transmission direction independently, and can only be changed by a user manipulating a position of the wireless device or the orientation of the directional antenna.

FIG. 1 shows system 100 with a pair of wireless devices A, B including antennas for communicating with each other. As shown and may be readily appreciated, by utilizing a fixed directional beam from each of antennas A, B, a distance of communication may be increased and/or transmission power and component costs may be reduced as compared to the omni-directional antennas discussed above. Fixed directional antennas, for example, are well suited for extending a local area network (LAN) between two locations, such as between two buildings. In this type of a system, each building may include a LAN or a portion thereof. Directional antenna devices may be utilized to bridge the LANs between the buildings with high reliability and without a need to run a fixed (e.g., wired) system between the buildings.

FIG. 2 shows two devices C, D using directional antennas that may form a communication beam in various directions and/or steer/switch beam directions from time to time as indicated by the transmission indication patterns showing sectors 1, 2, 3, 4. D-WPANs that consist of only one type of device, either fixed directional as shown in FIG. 1 or steerable directional devices as shown in FIG. 2 are referred to as homogenous D-WPANs.

There are also applications where fixed directional and steerable directional devices coexist and need to communicate with each other in a finite set of channels. This type of D-WPANs may be referred to as heterogeneous D-WPAN and is shown in FIG. 3. Some applications between a pair of devices may utilize an entire data period in a data channel. As the result of such an application, the channel that the application is using becomes unavailable to other devices/applications. These types of devices are referred to as non-sharing devices. On the other hand, applications that don't occupy an entire wireless channel may allow time-sharing of a (wireless) transmission medium with other devices, such as a time division multiple access (TDMA) device that shares a transmission medium by splitting the medium into temporal slices, wherein one or more of the slices may be allocated to a given device. Devices that do not occupy all of a transmission capability of a transmission medium are referred to as sharing devices.

Directional devices that need to communicate with each other usually need to locate each other before actual data transmission between the devices can start. Such a procedure is referred to as neighbor or device discovery in D-WPAN. There are solutions of neighbor discovery for homogenous D-WPAN, which might result in disjoined connection among mixed types of directional devices (e.g., devices sharing an area wherein one or more of the devices is a fixed directional device and one or more devices is a steerable device) that coexist, hereinafter referred to as heterogeneous D-WPANs. For example, in FIG. 3, device A, B are fixed directional devices with antennas aiming at each other, thus connected with each other. When Device D, a steerable device, powers on, it scans all its sectors and cannot hear device A or B's transmission due to directionality of their antennas. Therefore, device D is not connected to device A or B. Later on when device C powers on, device C can hear device D in its sector 4 and can hear device B in its sector 1. In this case, device C may choose to communicate with device D and form a D-WPAN with device D, or choose to talk to device B and thus join the D-WPAN formed by device A and B. However, in either case, the connection among device A, B C, D effectively becomes disjoined.

It is an object of the present system to overcome disadvantages and/or make improvements in the prior art. It is an object of the present system to provide a system of discovery in a heterogeneous D-WPAN environment that avoids resulting in a disjoined connection between devices.

The present system includes a system, method, communication protocol and device for controlling a steerable antenna to form a communication network. The antenna listens in each of a plurality of steerable sectors to determine whether a primary beacon is present; transmits a primary device beacon in each of the plurality of steerable sectors if the primary beacon is not present; and transmits a secondary device beacon in a first one of the plurality of steerable sectors wherein a primary beacon is discovered. The antenna may transmit the primary and/or secondary beacons on a different communication channel than a data communication channel. The antenna may transmit the primary and/or secondary beacons on a same communication channel as a data communication channel. The antenna device may divide the same communication channel into time slices. The antenna may utilize a first given time slice of a super-frame for the primary beacon, utilize a second given time slice of the super-frame for the secondary beacon, and utilize a third given time slice of the super-frame for the data communication. In one embodiment, primary, secondary and fixed directional beacons are transmitted in accordance with U.S. Application entitled, "APPARATUS AND METHOD FOR ENABLING DISCOVERY OF WIRELESS DEVICES" by Richard Chen, Chun-Ting Chou and Alireza Seyedi, the subject matter of which are hereby incorporated by reference as if set out in entirety herein.

The device may be a non-sharing device that is non-sharing of a communication channel in a non-sharing sector. The antenna may stop transmission of the primary or secondary device beacon in each of the plurality of steerable sectors other than the non-sharing sector. The antenna may transmit a secondary device beacon in a second one of the plurality of steerable sectors if the primary beacon is discovered in the first one of the plurality of steerable sectors and a beacon from a fixed directional antenna device or a secondary antenna device is detected in the second one of the plurality of steerable sectors. The plurality of steerable sectors may be up to 20 sectors or more and may be segmented into different size sectors. The device may repeat the listening to the primary beacon it receives and start to transmit a primary beacon, thus electing to become a primary device if the antenna ceases to receive the primary beacon.

The invention is explained in further detail, and by way of example, with reference to the accompanying drawings wherein.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, etc. However, it will be apparent to those of ordinary skill in the art that other embodiments that depart from these details would still be understood to be within the scope of the appended claims. Moreover, for the purpose of clarity, detailed descriptions of well known devices, circuits, techniques and methods are omitted so as not to obscure the description of the present system. It should be expressly understood that the drawings are included for illustrative purposes and do not represent the scope of the present system.

For purposes of simplifying a description of the present system, the term "operatively coupled" and formatives thereof as utilized herein refer to a connection between devices or portions thereof that enables operation in accordance with the present system. For example, an operative coupling may include one or more of a wired connection and/or a wireless connection between two or more devices that enables a one and/or two-way communication path between the devices or portions thereof.

The system and method described herein addresses problems in prior art systems. In accordance with an embodiment of the present system, a system, method and device may provide a simple solution to maintain connectivity in a heterogeneous environment. One solution is for all steerable devices to send control information in all the sectors of every steerable device. However, this would incur tremendous overhead as each steerable device may have up to 20 sectors or more that the device can steer its antenna. In accordance with the present system, a good trade-off is struck on a number of sectors in which the steerable device sends and/or listens for control information, therefore the overhead incurred by control information in multiple sectors is reduced while maximizing connectivity among D-WPAN devices within communication range.

In accordance with the present system, steerable devices determine a role of either a primary or secondary device based on an initial scan at power-on to avoid the overhead of sending beacons in all sectors of all the steerable devices. In accordance with the present system, the device discovery may be performed in a common control channel and the actual data communication may be switched to a different data channel. In another embodiment, a single channel may be utilized with time slices set up for either of data or control signals.

Figure 4:
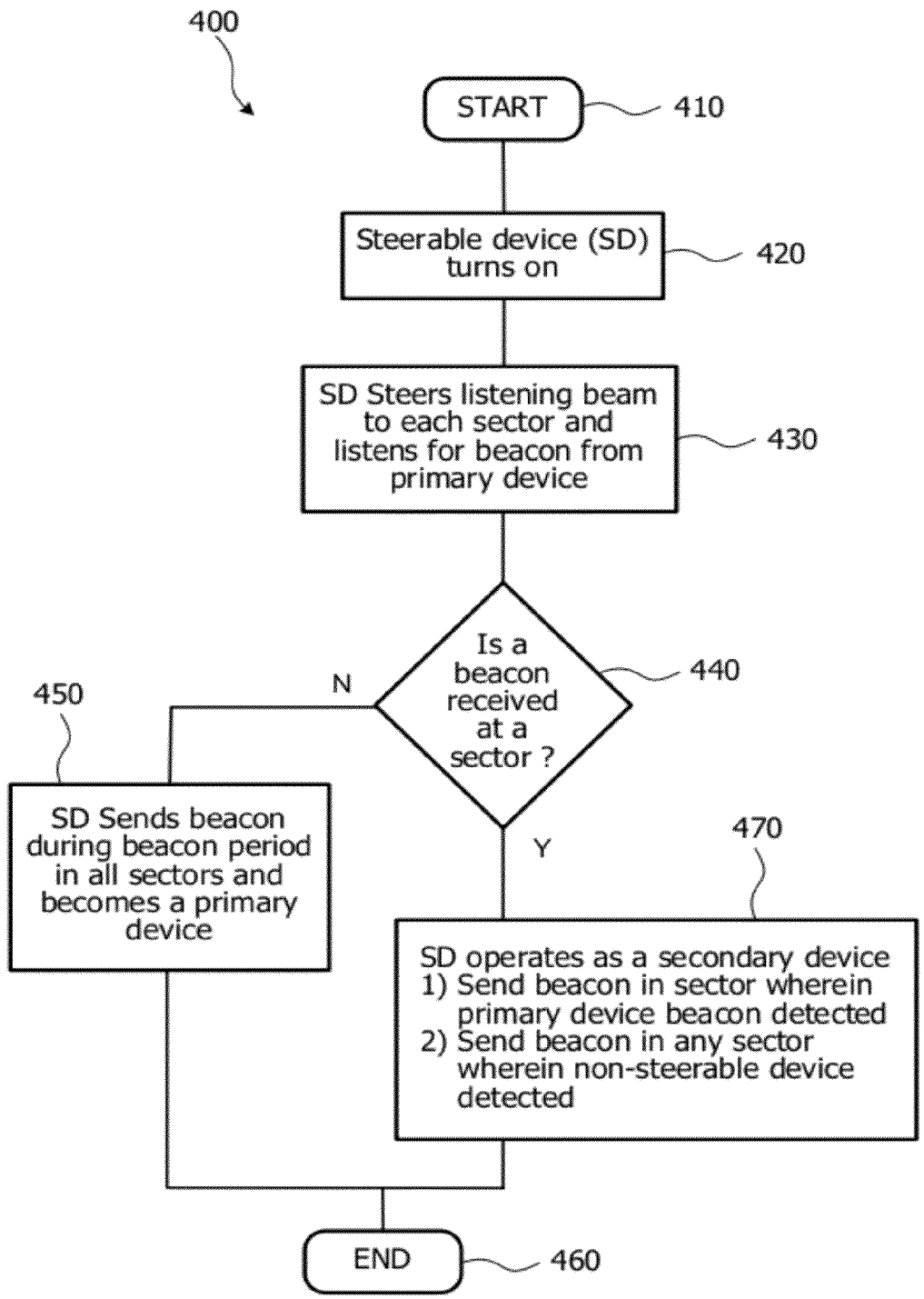
FIG. 4 shows a flow diagram showing an election process in accordance with an embodiment of the present system.

Operation of the present system will be described in accordance with one or more illustrative embodiments of the present system with reference to FIGS. 4, 5 and 6. FIG. 4 shows a flow diagram having an election process wherein a steerable devices determines whether to operate as a primary device or a secondary device in accordance with an embodiment of the present system. The current election procedure that may be performed by a steerable device is implemented to ensure that there is only one primary device in a D-WPAN. In accordance with the present system, each device determines at power on whether it should be a primary device as described in the illustrative embodiments shown.

Figure 1:
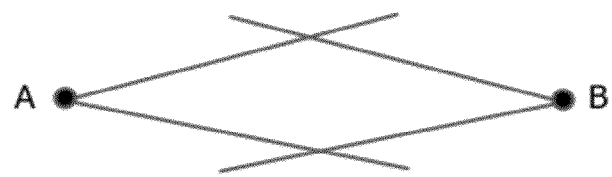
FIG. 1 shows a system with fixed directional antenna devices.
Figure 2:
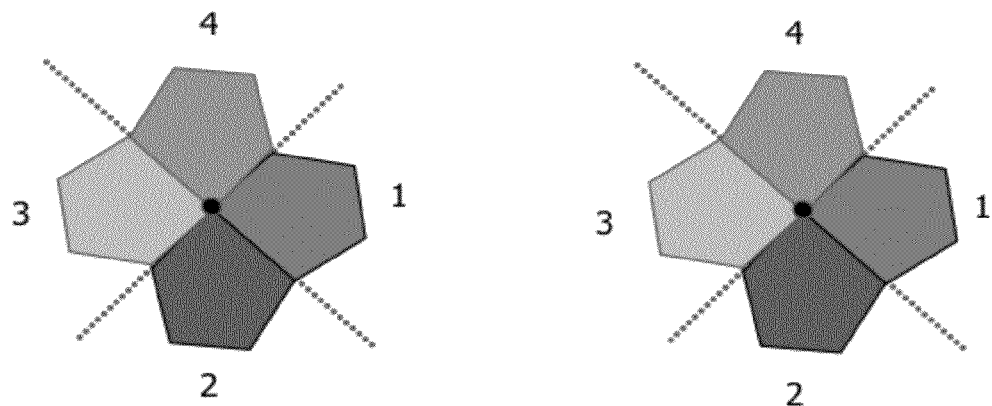
FIG. 2 shows a system with steerable directional antenna devices.
Figure 3:
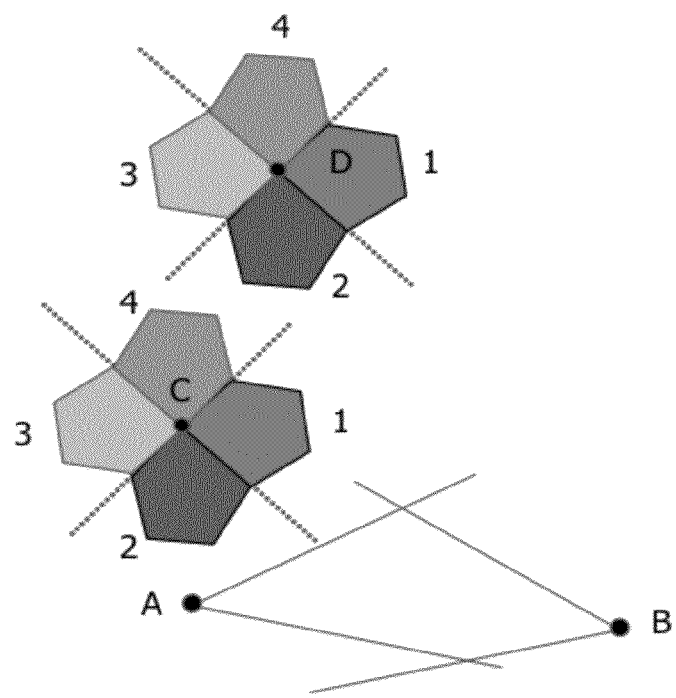
FIG. 3 shows a heterogeneous system including fixed directional antenna devices and steerable directional antenna devices.

The process starts during act 410 when thereafter, a steerable device powers on (hereinafter a turning-on device) during act 420. The turning-on device first steers its listening beam to each steerable sector of the device and listens for a period of Tscan in each steerable sector (e.g., sectors 1, 2, 3, 4 as shown in FIG. 3) during act 430 in search of beacons from other devices indicating that another device is already designated as a primary device. In one embodiment, a typical duration of a superframe may be in a range of 50 ms (e.g., 64 ms in Ecam368 specification for WiMedia Ultra-Wideband based radio) to 100 ms (e.g. WiFi radio). In another embodiment, a superframe may be set as short as 16.67 ms (a duration of a video frame) to accommodate a streaming video application. Naturally other durations and ranges may be applicable in other applications and the claims are not intended to limited to any particular range or value unless specifically stated otherwise. In an embodiment of the present system, Tscan may be at least a duration of a super-frame, however may be longer.

In a case wherein there is no beacon from a primary device detected after Tscan in each sector, as determined during act 440, the turning-on device may start its own beacon period during act 450 wherein the turning-on device transmits a beacon in all its steerable sectors during a beacon period (e.g. 16.67 ms) in every super-frame and thereby becomes a primary device. Thereafter the process ends for this turning-on device during act 460 until some change in system status occurs, like the primary device (e.g., the prior turning-on device) moves out of range or turns off, or a non-sharing primary device stops sending primary beacons in all its sectors. In this case, a secondary device that previously received the primary beacon from the primary device would stop receiving the primary beacon. In accordance with an embodiment of the present system, the secondary device may start listening for another primary beacon in each of its steerable sectors and continue thereafter similar as described above regarding turn-on of the device. To avoid two or more secondary device electing to become a primary device simultaneously, each device may wait a random period of time prior to going through the listening on each of the steerable sectors. In this way, the waiting periods are likely to be different since each period is randomly selected and therefore, one of the secondary devices is likely to become a primary device prior to another one of the secondary devices. Other changes in status would readily occur to a person of ordinary skill in the art and are intended to be encompassed by the present system.

Figure 5:
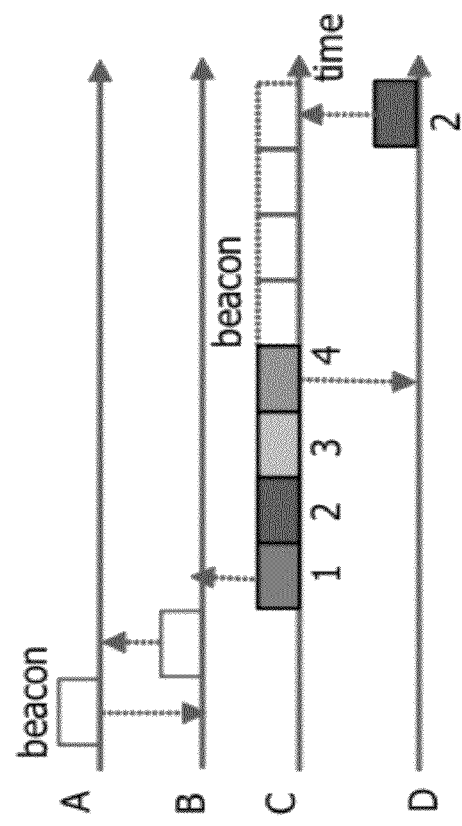
FIG. 5 shows a heterogeneous system including fixed directional antenna devices and steerable directional antenna devices and a communication protocol in accordance with an embodiment of the present system.
Figure 5:
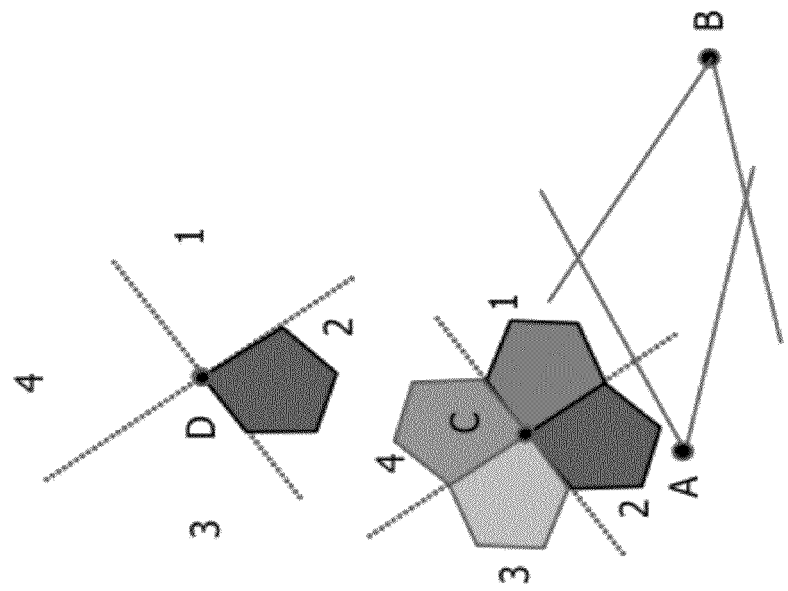
Figure 6:
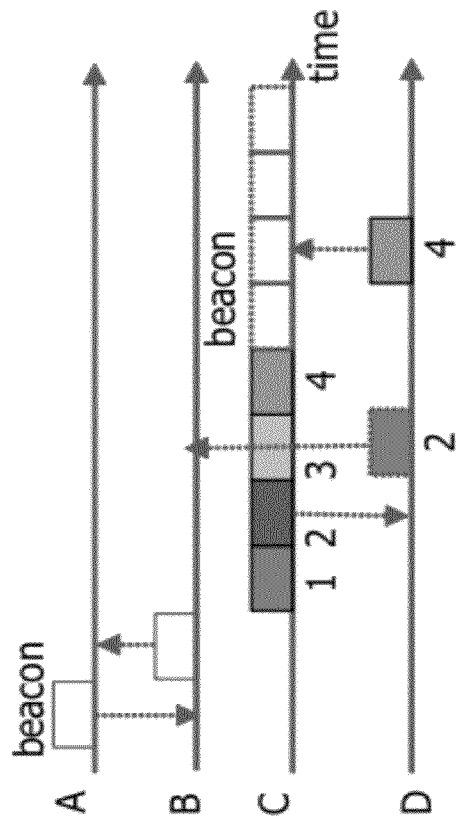
FIG. 6 shows a heterogeneous system including fixed directional antenna devices and steerable directional antenna devices and a communication protocol in accordance with an embodiment of the present system.
Figure 6:
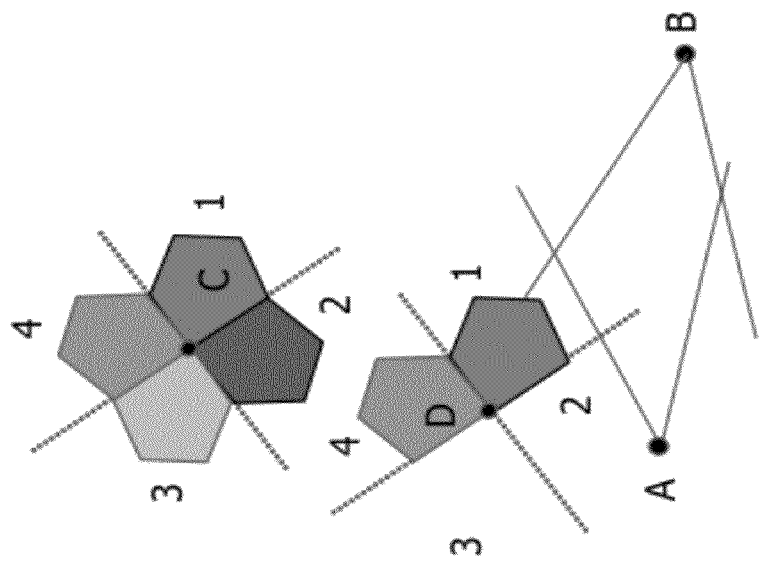

An illustration of such a procedure is shown in FIGS. 5 and 6 which show heterogeneous systems including fixed directional antenna devices and steerable directional antenna devices and a communication protocol in accordance with embodiments of the present system.

As shown in FIG. 5, devices A and B are non-steerable device and as such are set up for communication position with beams facing towards each other, although as should be appreciated, it does not matter what order the non-steerable devices A, B come "on-line" since these devices may not be designated as primary devices in accordance with the present system. For purposes of simplifying the following description, each steerable device C, D is shown having an ability to transmit in four (4) sectors that are similarly apportioned in size, etc. As may be readily appreciated, clearly more sectors may be available to the steerable devices C, D (e.g., 20 or more sectors) and in some case, one or more of the steerable devices may have an ability to transmit in more or less sectors than one or more other steerable devices. None of the illustrative features shown in the figures are intended as limitations of the claims unless specifically presented as such.

In accordance with the description contained above regarding FIG. 5, steerable device C turns on and begins transmission sometime after the non-steerable devices A, B. As no beacon from a primary device is detected in any steerable sector 1, 2, 3, 4 during the beacon listening period, the steerable device C begins sending beacons on each of the steerable sectors 1, 2, 3, 4 thereafter. Sometime thereafter, a steerable device D turns on. As described, the steerable device D scans all steerable sectors 1, 2, 3, 4 and discovers the beacon from the primary device C in steerable sector 2 of the steerable device D. Accordingly, the steerable device D starts acting like a secondary device, namely transmitting its secondary beacon in its sector 2 wherein the primary beacon from steerable device C was discovered. This process is shown from the timing diagram wherein a beacon from the steerable device C is received by the steerable device D which thereafter, transmits its beacon in sector 2 of the steerable device D.

FIG. 6, similar as FIG. 5 begins illustratively after non-steerable devices A, B are established. A steerable device C turns on and first listens (receives) in all steerable sectors for a primary beacon. As no primary device is established prior to the turn on of the steerable device C, the steerable device C becomes a primary device and transmits primary beacons on all steerable sectors as shown in the timing diagram. Thereafter, a steerable device D turns on. As described, the steerable device D scans all steerable sectors and discovers the beacon from the primary device C. Accordingly, the steerable device D starts acting like a secondary device, namely transmitting its secondary beacon in the sector wherein the primary beacon was discovered. In addition, since during turn on scanning of all sectors, the steerable device D finds a beacon sent by a fixed directional (non steerable) device B in its sector 1 which is a different sector than where device D discovered the primary device C, the steerable device D sends an additional beacon in sector 1 where it hears (e.g., receives) the beacon from the non-steerable device B. It is worth noting that since device A's beam is pointing to device B, the angle of device A's beam indicates that device D is not covered in A's beam, and accordingly, device D does not receive a beacon from device A. In a case wherein one of the non-steerable devices A, B are located in the same sector as the primary device (e.g., the steerable device C), then the steerable device D will have initiated a beacon in that sector as a result of discovering the beacon from the (primary) steerable device C and will not send additional secondary beacons to that non-steerable device.

In a case wherein a non-sharing secondary device starts data transmission, the non-sharing secondary device may stop sending a beacon in sectors different from the non-time-sharing sector to facilitate spatial reuse and thereby downgrade itself to a non-steerable device in a sense, in accordance with an embodiment of the present system. The spatial reuse enables other devices to utilize the sector wherein the non-sharing secondary device stopped sending beacons that includes reservation information, in effect, stopping to exclude other devices from utilizing the sector.

In accordance with one embodiment of the present system a dedicated data channel may be utilized which is separate from a control channel. In one embodiment, in a case wherein the data communication of a non-sharing primary device is performed in a different channel from the control channel, the non-sharing primary device may also stop sending a beacon in sectors different from the non-time-sharing sector to facilitate spatial reuse after the non-sharing primary device starts data transmission in the non-time-sharing sector.

In accordance with an embodiment of the present system, in a case wherein a secondary device hears beacons from a different beacon group, the secondary device may start to combine beacon groups together as may be readily appreciated, for example in accordance with U.S. Provisional Application entitled, "APPARATUS AND METHOD FOR MERGING BEACON TRANSMISSION AND RECEPTION" by Chun-Ting Chou, Hongqiang Zhai and Richard Chen, PCT Patent Application No. IB2008/050128 filed Jan. 15, 2008, or in accordance with U.S. Provisional Patent Application No. 60/885,167 filed Jan. 16, 2007, the subject matter of each of which are hereby incorporated by reference as if set out in entirety herein.

Figure 7:
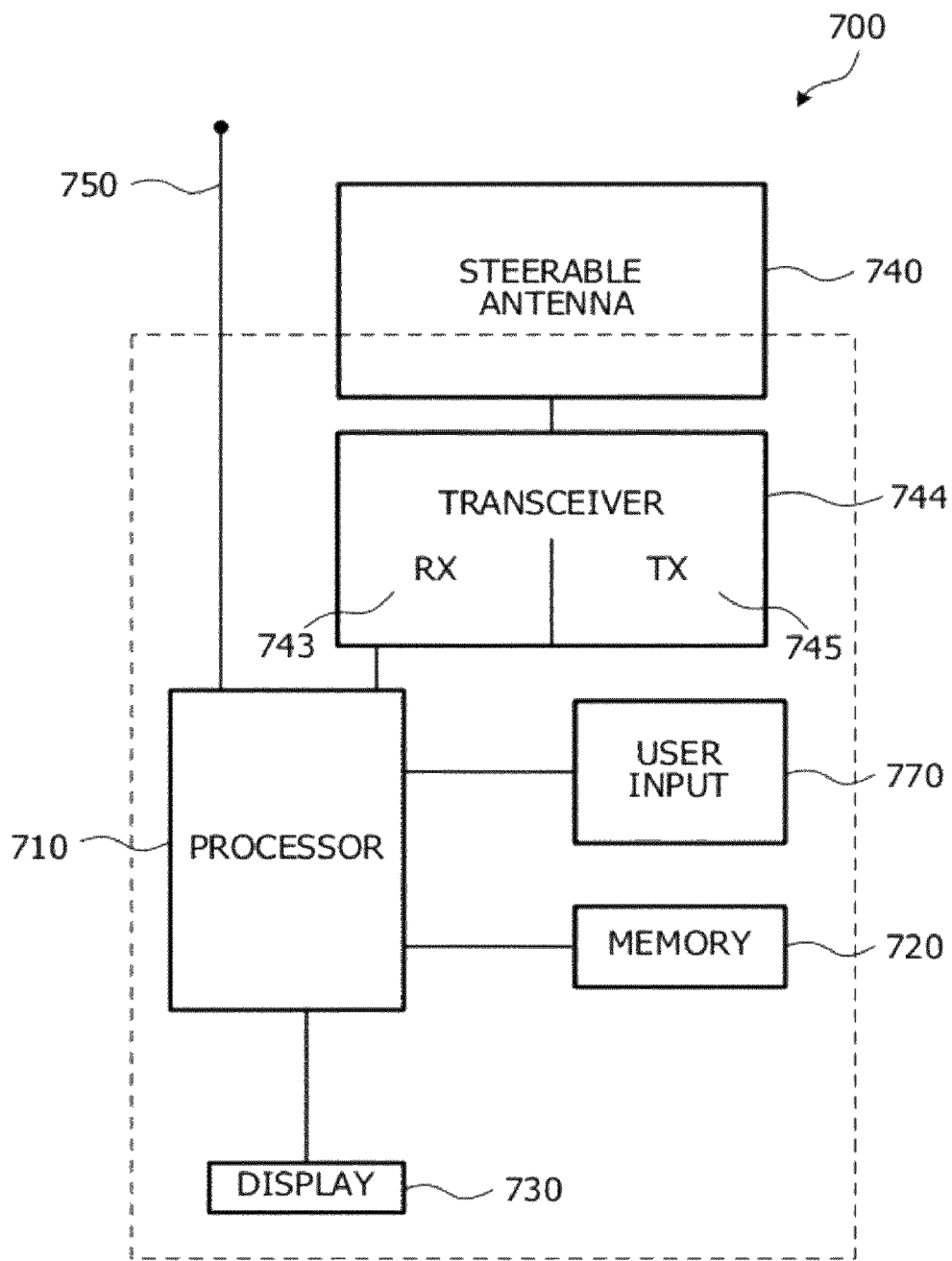
FIG. 7 shows a portion of a device including a steerable antenna in accordance with an embodiment of the present system.

FIG. 7 shows a portion of a device 700 having a steerable antenna 740 in accordance with an embodiment of the present system. For example, a portion of the present system 700 may further include a processor 710 operably coupled to a memory 720, a display 730, a wired connection 750, a user input device 770, and the steerable antenna 740 via a transceiver 744. Transceiver 744 may include a receiver 743 and a transmitter 745, and provides functionality for the present system 700 to communicate with another such a system, for example over a wireless communication network according to the appropriate standard protocols. The memory 720 may be any type of device for storing algorithms and/or application data as well as other data related to the described operation. The application data and other data are received by the processor 710 for configuring the processor 710 to perform operation acts in accordance with the present system. The operation acts may include powering on, searching available sectors for beacons, transmitting beacons, etc. Details of the device 700 are not introduced to simplify the discussion herein although would be apparent to a person of ordinary skill in the art. The device 700, depending on exactly the application, may include the user input 770 and the display 730 to facilitate particular aspects of those embodiments although are not required for operation.

The operation acts of the processor 710 may further include controlling the display 730 to display content such as any content that would be applicable to the device 700, such as a user interface. The user input 770 may include a keyboard, mouse, trackball or other device, including touch sensitive displays, which may be stand alone or be a part of a system, such as part of a personal computer, personal digital assistant, mobile phone, set top box, television or other device for communicating with the processor 710 via any operable link. The user input device 770 may be operable for interacting with the processor 710 including enabling interaction within the user interface and/or other elements of the present system. Clearly the processor 710, the memory 720, display 730, the steerable antenna 740 and/or user input device 770 may all or partly be a portion of an antenna device or other device for operation in accordance with the present system, such as setting up a heterogeneous communication system including start-up and discovery of a plurality of steerable and non-steerable devices.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 720 or other memory coupled to the processor 710.

The memory 720 configures the processor 710 to implement the methods, operational acts, and functions disclosed herein. The memories may be distributed, for example between the steerable antenna and the processor 710, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 710. With this definition, information accessible through the wired connection 750 (e.g., wired connection to a network such as the Internet) and/or the antenna 740 is still within the memory 720, for instance, because the processor 710 may retrieve the information from one or more of the operable connections 740, 750 in accordance with the present system.

The processor 710 is operable for providing control signals and/or performing operations in response to input signals from the user input device 770 as well as in response to other devices of a network and executing instructions stored in the memory 720. The processor 710 may be an application-specific or general-use integrated circuit(s). Further, the processor 710 may be a dedicated processor for performing in accordance with the present system or may be a general-purpose processor wherein only one of many functions operates for performing in accordance with the present system. The processor 710 may operate utilizing a program portion, multiple program segments, or may be a hardware device utilizing a dedicated or multi-purpose integrated circuit.

Further variations of the present system would readily occur to a person of ordinary skill in the art and are encompassed by the following claims. Through operation of the present system, a heterogeneous network may be initiated and operated.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method of turning on a steerable antenna device to form a communication network, the method comprising acts of:
   listening in each of a plurality of steerable sectors to determine whether a primary beacon is present;
   transmitting a primary device beacon in each of the plurality of steerable sectors if the primary beacon is not present;
   transmitting a secondary device beacon in a first one of the plurality of steerable sectors if a primary beacon is discovered, and
   transmitting a secondary device beacon in a second one of the plurality of steerable sectors if the primary beacon is discovered in the first one of the plurality of steerable sectors and a beacon from one of a fixed or secondary directional antenna device is detected in the second one of the plurality of steerable sectors.

2. The method of claim 1, wherein the primary and secondary beacons are transmitted on a different communication channel than a data communication channel.

3. The method of claim 1, wherein the primary and secondary beacons are transmitted on a same communication channel as a data communication channel, wherein the same communication channel is divided into time slices and wherein a first given time slice of a super-frame is utilized for the primary beacon, a second given time slice of the super-frame is utilized for the secondary beacon, and a third given time slice of the super-frame is utilized for the data communication.

4. The method of claim 1, wherein the steerable device is one of a non-sharing primary or secondary device that is non-sharing of a communication channel in a non-sharing sector, the method comprising an act of stopping transmission of the primary device beacon in each of the plurality of steerable sectors other than the non-sharing sector.

5. The method of claim 1, wherein the secondary steerable device transmits a primary beacon to act as a primary device if the steerable device ceases to receive the primary beacon.

6. An application embodied on a non-transitory computer readable medium arranged to control turn on of a steerable antenna device to form a communication network, the application comprising:
a portion configured to control listening in each of a plurality of steerable sectors to determine whether a primary beacon is present;
a portion configured to control transmitting a primary device beacon in each of the plurality of steerable sectors if the primary beacon is not present;
a portion configured to control transmitting a secondary device beacon in a first one of the plurality of steerable sectors if a primary beacon is discovered, and
a portion configured to control transmitting a secondary device beacon in a second one of the plurality of steerable sectors if the primary beacon is discovered in the first one of the plurality of steerable sectors and a beacon from a fixed or secondary directional antenna device is detected in the second one of the plurality of steerable sectors.

7. The application of claim 6, wherein the primary and secondary beacons are transmitted on a different communication channel than a data communication channel.

8. The application of claim 6, wherein the primary and secondary beacons are transmitted on a same communication channel as a data communication channel, wherein the same communication channel is divided into time slices and wherein a first given time slice of a super-frame is utilized for the primary beacon, a second given time slice of the super-frame is utilized for the secondary beacon, and a third given time slice of the super-frame is utilized for the data communication.

9. The application of claim 6, wherein the steerable device is one of a non-sharing primary or secondary device that is non-sharing of a communication channel in a non-sharing sector, the application comprising a portion configured to control stopping transmission of the primary or secondary device beacon in each of the plurality of steerable sectors other than the non-sharing sector.

10. The application of claim 6, wherein the application is configured to repeat the listening and transmitting one of the primary or secondary beacons if the steerable device ceases to receive the primary beacon.

11. A steerable antenna device configured to form a communication network, the device comprising:
an antenna configured to:
listen in each of a plurality of steerable sectors to determine whether a primary beacon is present;
transmit a primary device beacon in each of the plurality of steerable sectors if the primary beacon is not present;
transmit a secondary device beacon in a first one of the plurality of steerable sectors if a primary beacon is discovered; and
transmit a secondary device beacon in a second one of the plurality of steerable sectors if the primary beacon is discovered in the first one of the plurality of steerable sectors and a beacon from a fixed or secondary directional antenna device is detected in the second one of the plurality of steerable sectors.

12. The device of claim 11, wherein the antenna is configured to transmit the primary and secondary beacons on a different communication channel than a data communication channel.

13. The device of claim 11, wherein the primary and secondary beacons are transmitted on a same communication channel as a data communication channel and wherein the antenna is configured to divide the same communication channel into time slices, wherein the antenna is configured to utilize a first given time slice of a super-frame for the primary beacon, is configured to utilize a second given time slice of the super-frame for the secondary beacon, and is configured to utilize a third given time slice of the super-frame for the data communication.

14. The device of claim 11, wherein the antenna is configured as a non-sharing antenna that is non-sharing of a communication channel in a non-sharing sector, and wherein the antenna is configured to stop transmission of the primary or secondary device beacon in each of the plurality of steerable sectors other than the non-sharing sector.

15. The device of claim 11, wherein the antenna is configured to repeat the listening and transmitting one of the primary or secondary beacons if the antenna ceases to receive the primary beacon.

16. A communication protocol stored on a non-transitory computer readable memory medium for turning on a steerable antenna device to form a communication network, the communication protocol comprising acts of:
listening in each of a plurality of steerable sectors to determine whether a primary beacon is present;
transmitting a primary device beacon in each of the plurality of steerable sectors if the primary beacon is not present;
transmitting a secondary device beacon in a first one of the plurality of steerable sectors if a primary beacon is discovered; and
transmitting a secondary device beacon in a second one of the plurality of steerable sectors if the primary beacon is discovered in the first one of the plurality of steerable sectors and a beacon from a fixed or secondary directional antenna device is detected in the second one of the plurality of steerable sectors.

17. The communication protocol of claim 16, wherein the primary and secondary beacons are transmitted on a different communication channel than a data communication channel.

18. The communication protocol of claim 16, wherein the primary and secondary beacons are transmitted on a same communication channel as a data communication channel, wherein the same communication channel is divided into time slices, and wherein a first given time slice of a super-frame is utilized for the primary beacon, a second given time slice of the super-frame is utilized for the secondary beacon, and a third given time slice of the super-frame is utilized for the data communication.

19. The communication protocol of claim 16, wherein the communication protocol includes communicating with a non-sharing primary device that is non-sharing of a communication channel in a non-sharing sector, the communication protocol comprising stopping transmission of the primary or secondary device beacon in each of the plurality of steerable sectors other than the non-sharing sector.

20. The communication protocol of claim 16, wherein the protocol comprises repeating the listening and transmitting one of the primary or secondary beacons if the primary beacon ceases to be received.

* * * * *